United States Patent [19]
Koralewski et al.

[11] Patent Number: 5,875,239
[45] Date of Patent: Feb. 23, 1999

[54] TELEPHONE CALL SCREENING SYSTEM

[76] Inventors: Karen L. Koralewski, 3465 Waterville-Swanton Rd., Swanton, Ohio 43558; Christopher J. Brown, P.O. Box 13381, Research Triangle Park, N.C. 27709-3381

[21] Appl. No.: 752,325

[22] Filed: Nov. 19, 1996

Related U.S. Application Data

[60] Provisional application No. 60/007,506 Nov. 22, 1995.

[51] Int. Cl.[6] .................................................. H04M 1/56
[52] U.S. Cl. ........................ 379/142; 379/93.23; 379/120
[58] Field of Search ................................. 379/120, 122, 379/142, 127, 130, 133, 140, 93.23, 102.03

[56] References Cited

U.S. PATENT DOCUMENTS 5,414,457  5/1995  Kadowaki et al. ...................... 379/142
5,546,447  8/1996  Skarbo et al. .......................... 379/142

FOREIGN PATENT DOCUMENTS

WO93/01685  1/1993  U.S.S.R. .

*Primary Examiner*—Curtis A. Kuntz
*Assistant Examiner*—Duc Nguyen
*Attorney, Agent, or Firm*—Marshall & Melhorn

[57] ABSTRACT

A system for screening telephone calls that include a caller identification information signals has a caller identification processor connected to a telephone line for generating caller identification information signals to a computer that retrieves an image associated with the caller from a database and displays the image on a television. A time delay also can be stored in the database to delay the display of the image by a predetermined amount. A user can change both the image and the time delay. The image can be alphanumeric and/or pictorial and can include audio information.

12 Claims, 4 Drawing Sheets

TELEPHONE CALL SCREENING SYSTEM

This application is claiming the benefit, under U.S.C. §119(e), of the provisional application filed Nov. 22, 1995 under 35 U.S.C. §111(b), which was granted Ser. No. 60/007,506. The provisional application, 60/007,506 is hereby incorporated by reference.

BACKGROUND OF THE INVENTION

The present invention relates generally to an apparatus for identifying telephone caller numbers and, in particular, to an system for screening incoming telephone calls on a television screen.

Presently, the owner of a telephone is subject to unwanted telephone calls from telephone telemarketing persons, charities, stockbrokers, credit card solicitors, and political campaign solicitors, for example. These calls are annoying, tend to be placed at meal times and may also include calls from bill collecting agencies, pranksters and scam artists.

Since it is impossible to effectively eliminate unwanted telephone calls, much wasted time is spent because most persons have been taught manners which tend to make it extremely difficult to hang up immediately in respect of unsolicited calls. Accordingly, this problem has been the topic of much consideration. Legislation has even been proposed to limit the use of automatic telephone call solicitation.

Currently, many telephone companies offer a caller identification service wherein a small display unit is connected to the subscriber's telephone line to display the telephone numbers of incoming calls. However, the display unit typically is located adjacent one telephone set and users must be very near such a device to see the caller-id information.

SUMMARY OF THE INVENTION

The present invention concerns a system for screening telephone calls including caller identification information signals including: a computer having a first input for connection to a source of a caller identification information signal, a second input for connection to a source of a program signal and an output for connection to a video display, the computer being responsive to a program signal at the second input for generating a program output signal at the computer output; and a database memory for storing at least one image associated with a predetermined caller identification information signal and having an input/output connected to an input/output of the computer. When the computer first input is connected to a source of a caller identification information signal, the computer second input is connected to a source of a program signal and the computer means output is connected to a video display, the computer responds to the caller identification information signal to obtain the one image from the database memory and responds to a program signal received from the program signal source to generate a program output signal to the video display and display the one image on the video display.

The present invention also concerns a method of screening telephone calls including caller identification information signals including the steps of: storing at least one image associated with a predetermined caller identification information signal; monitoring a telephone line for the predetermined caller identification information signal; obtaining the one image from storage when the predetermined caller identification information signal is generated on the telephone line by a caller; combining the one image with a program signal; and displaying the program signal and the one image on a video display to inform a user viewing the video display of information related to an identity of the caller. The method also includes the step of storing a predetermined time delay associated with the predetermined caller identification information signal, the step of obtaining the predetermined time delay from storage when the predetermined caller identification information signal is generated on the telephone line by the caller and the step of delaying the display of the program signal and the one image by the amount of the predetermined time delay.

It is an object of the present invention to display caller identification information on a television screen to enable a telephone subscriber to make an informed decision as to whether the telephone should be answered.

It is another object of the invention to display telephone caller related information including identification of the caller's name and/or picture, or product being offered for sale.

It is a further object of the present invention display more complex images than can be displayed on telephone caller identification devices.

It is another object of the present invention to variably and selectively delay the time at which caller identification information is displayed.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The present invention concerns a method and a system for displaying caller identification (CID) information on a television set. The invention provides a much more convenient display of caller identification information than is provided by currently available devices. Televisions are designed to be viewed from a distance and, because of the larger display size, users of CID information can see, and therefore use, that information from many more locations in their home. If the user is not in the vicinity of the telephone, he or she can still use the CID information without moving into the vicinity of the telephone.

Figure 1:
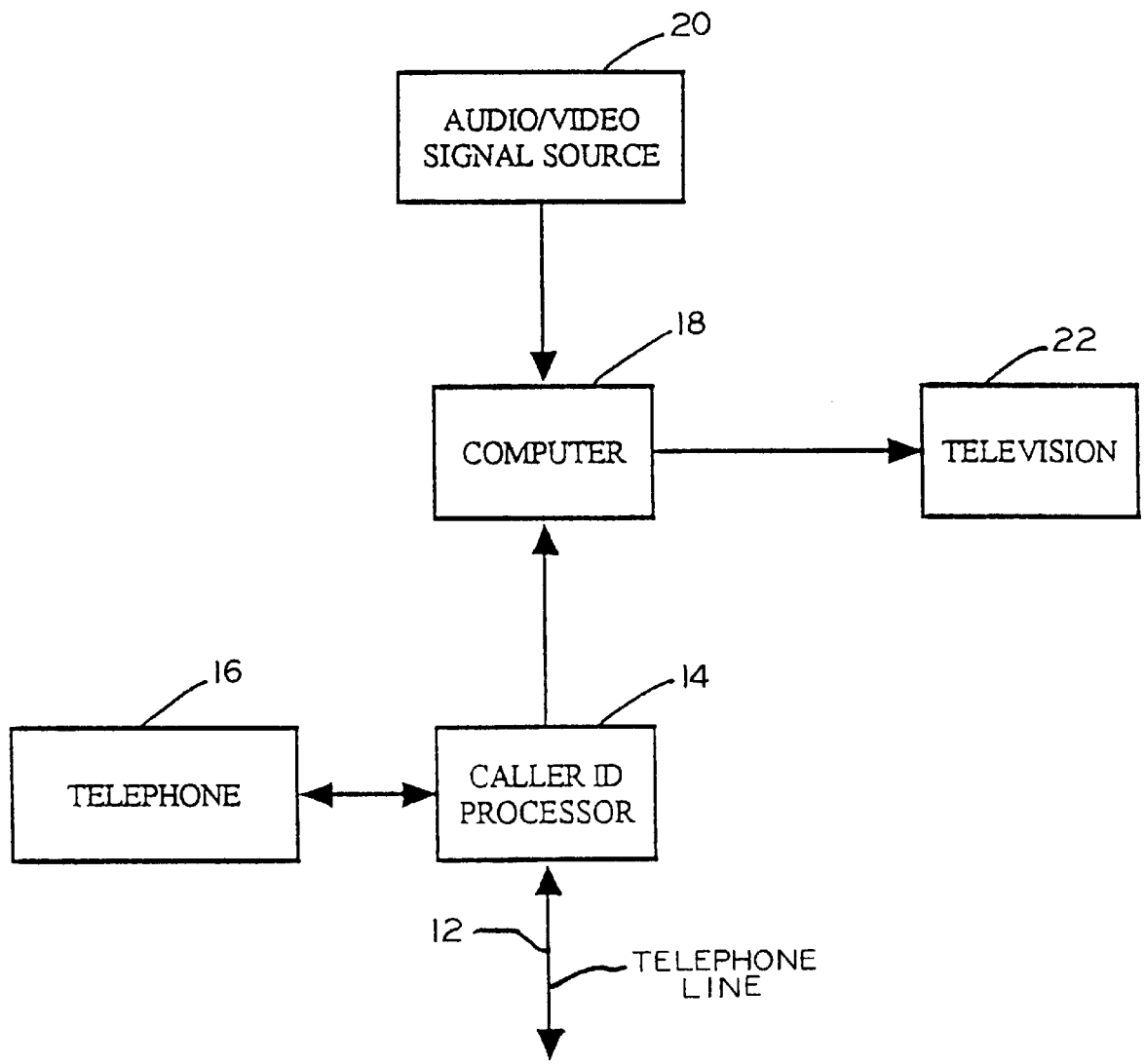
FIG. 1 is a schematic block diagram of a telephone call screening system in accordance with the present invention.

There is shown in the FIG. 1 a telephone call screening system 10 in accordance with the present invention. A user's telephone line 12 is connected to an input/output of a caller ID processor means 14 which generates processed caller identification information signals from caller identification information signals placed on the telephone line by the telephone company providing CID service. Another input/output of the processor means 14 is connected to a conventional telephone 16 which can used to place and receive telephone calls over the telephone line 12. An output of the processor means 14 is connected to an input of a computer 18 which has another input connected to an output of a standard audio/video signal source 20. The computer 18 also has an output connected to an input of a standard television receiver 22. The computer 18 normally generates a program output signal to the television 22 which causes the display of the program material received from the source 20. However, the computer 18 also combines the processed CID information signals received from the processor means 14 with the standard program signal received from the source 18 to generate a program output signal which causes the display of call screening information by the television 22.

Not only does the system 10 provide a larger display of the processed CID information, the system also makes the display available for a longer portion of the user's day since most people spend more time watching television than being in the vicinity of the telephone. The use of a television display also permits the use of complex images rather than being limited to the small alphanumeric monochrome display of most telephone caller ID devices. As described below, the system 10 can be supplemented with an image storage component which provides displays of symbols and photographs and/or an audio representation of the caller. Furthermore, the system 10 can be programmed to delay the CID information display. Thus, one of the conveniences offered by the present invention is the ability to display the CID information after the call attempt has been made, or, to not display it at all. Unknown or unimportant callers could have their CID information displayed after the call attempt has been made, perhaps during a television broadcast commercial break. Unwelcome callers could be delayed indefinitely, implementing a form of call blocking.

Figure 2:
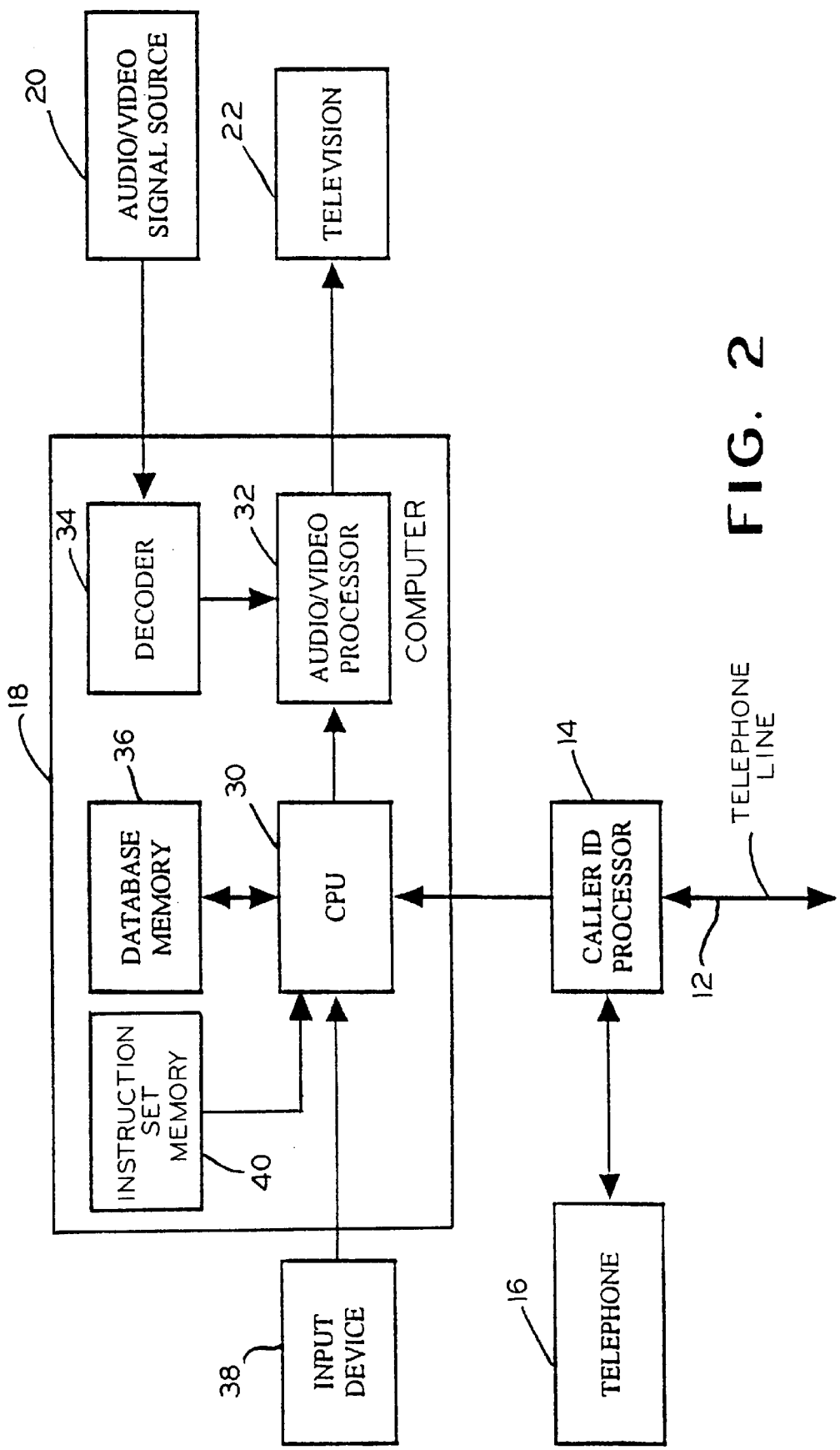
FIG. 2 is a more detailed schematic block diagram of the telephone call screening system shown in the FIG. 1.

The system 10 is shown in more detail in the FIG. 2 wherein the computer 18 includes a central processing unit 30 having an input connected to the output of the caller ID processor 14 for receiving the CID information signals. The computer 18 also includes an audio/video processor 32 having an input connected to an output of the CPU 30 and an output connected to the input of the television 22. The computer 18 further includes a decoder 34 having an input connected to an output of the audio/video signal source 20 and an output connected to an input of the audio/video processor 32. A database memory 36 is included in the computer 18 and has an input/output connected to an input/output of the CPU 30. An input device 38 has an output connected to an input of the CPU 30.

The audio/video signal source 20 can be one or more conventional sources of audio and/or video program signals typically connected to a standard television receiver. For example, an FM tuner/receiver connected to an antenna can be used as a source of audio input signals. A cable system cable or a satellite TV system antenna can be used as a source of both audio and video input signals. Most cable and satellite input signals require decoding by the decoder 34 before they can be displayed on the television. Thus, the decoder 34 can be, for example, a conventional cable set top box or the box supplied with the satellite antenna generating a decoded program signal. If the source 20 is a standard unscrambled radio or television signal, the decoder 34 would not be required.

The various components of the system 10 can be packaged in a variety of ways including incorporated into the television 22 or a video cassette recorder (not shown) connected to the television. The caller ID processor 14, the CPU 30, the audio/video processor 32, the decoder 34, the database memory 36 and the input device 38 can be packaged together by a cable or a satellite TV provider. The caller ID processor 14 can be a separate device which is currently commercially available. As stated above, the decoder 34 can be a separate device which is currently commercially available. The input device 38 can be a separate device such as a remote control for the television 22.

The CPU 30 operates under the control of a software program stored in the INSTRUCTION SET MEMORY 40 separate from the database memory 36 and described in connection with the flow diagrams shown in the FIG. 3 and the FIG. 4. The CPU 30 utilizes processed CID information signals received from the caller ID processor 14 to form an image which is combined with the program signal received from the source 20 whereby the image appears as an overlay on the television picture and/or audio output. The input device 38 is used to generate data signals to which the CPU 30 responds by storing and changing images (the image database) in the database memory 36 and associating each image with one or more CID signals received on the telephone line 12. For example, the image can be a numeric, symbolic, photographic, or audio representation of the person or entity initiating the call which generates the CID information or even a product or service being offered by the caller. The input device 38 also can be used to store user instructions to block and/or delay the display of CID information (the block/delay database) and associate each instruction with one or more CID signals received on the telephone line 12. The system 10 automatically operates in response to receiving a CID information signal to check the database memory 36 for associated images and user instructions, retrieves the associated image from the image database and then displays that image on the television 22 subject to the associated user instruction.

Figure 3:
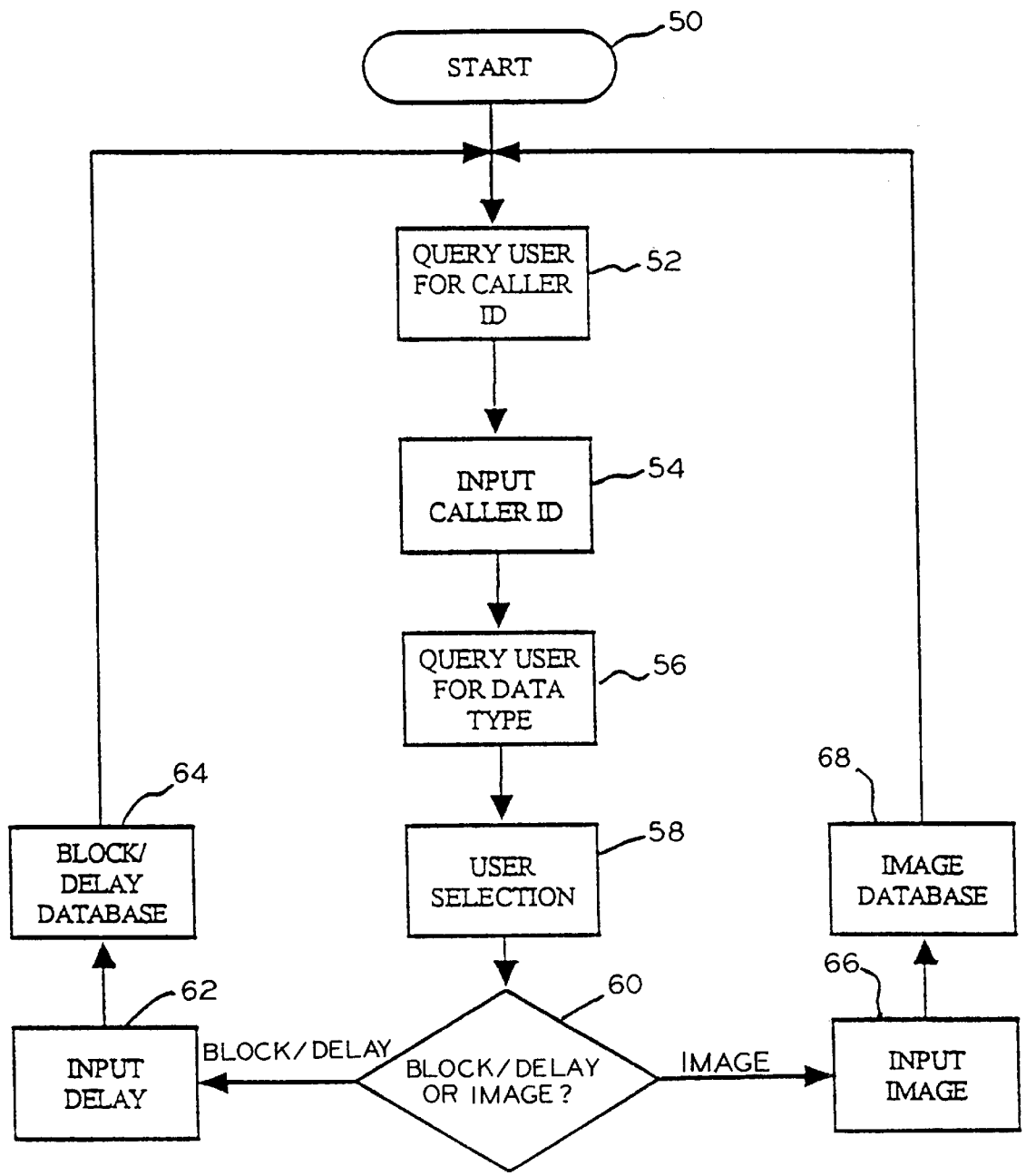
FIG. 3 is flow diagram of a method of operating the system shown in the FIG. 1 to generate an image database.

There is shown in the FIG. 3 a flow diagram of a method of preparing an image database for the display of CID information on a television screen according to the present invention. The method begins at a START 50 entry point and enters an instruction set QUERY USER FOR CALLER ID 52. The instruction set 52 places the system 10 into a mode of operation in which a user can modify the default images in the image database. The default image is the numeric representation of the telephone number of the calling party. The method then enters an instruction set INPUT CALLER ID 54 wherein the system queries the user for a CID with which a modified image is to be associated. The method then enters an instruction set QUERY USER FOR DATA TYPE 56 wherein the user enters a CID through an input device. Next, the method enters an instruction set USER SELECTION 58 wherein the system queries the user for the type of information which will be forthcoming. At this time, the information could be an image or block/delay information.

When the user makes the requested selection, the method branches from a decision point 60. If a block is desired, the method branches to an instruction set INPUT DELAY 62 wherein the user adds or modifies block/delay information for the CID under consideration. The method then enters an instruction set BLOCK/DELAY DATABASE 64 wherein the corresponding information in the block/delay database is updated. The method then returns to the instruction set 52 for processing the next CID. If an image is desired, the method branches to an instruction set INPUT IMAGE 66 wherein the user adds or modifies image information for the CID under consideration. The method then enters an instruction set IMAGE DATABASE 68 wherein the corresponding information in the image database is updated. The method then returns to the instruction set 52 for processing the next CID.

Figure 4:
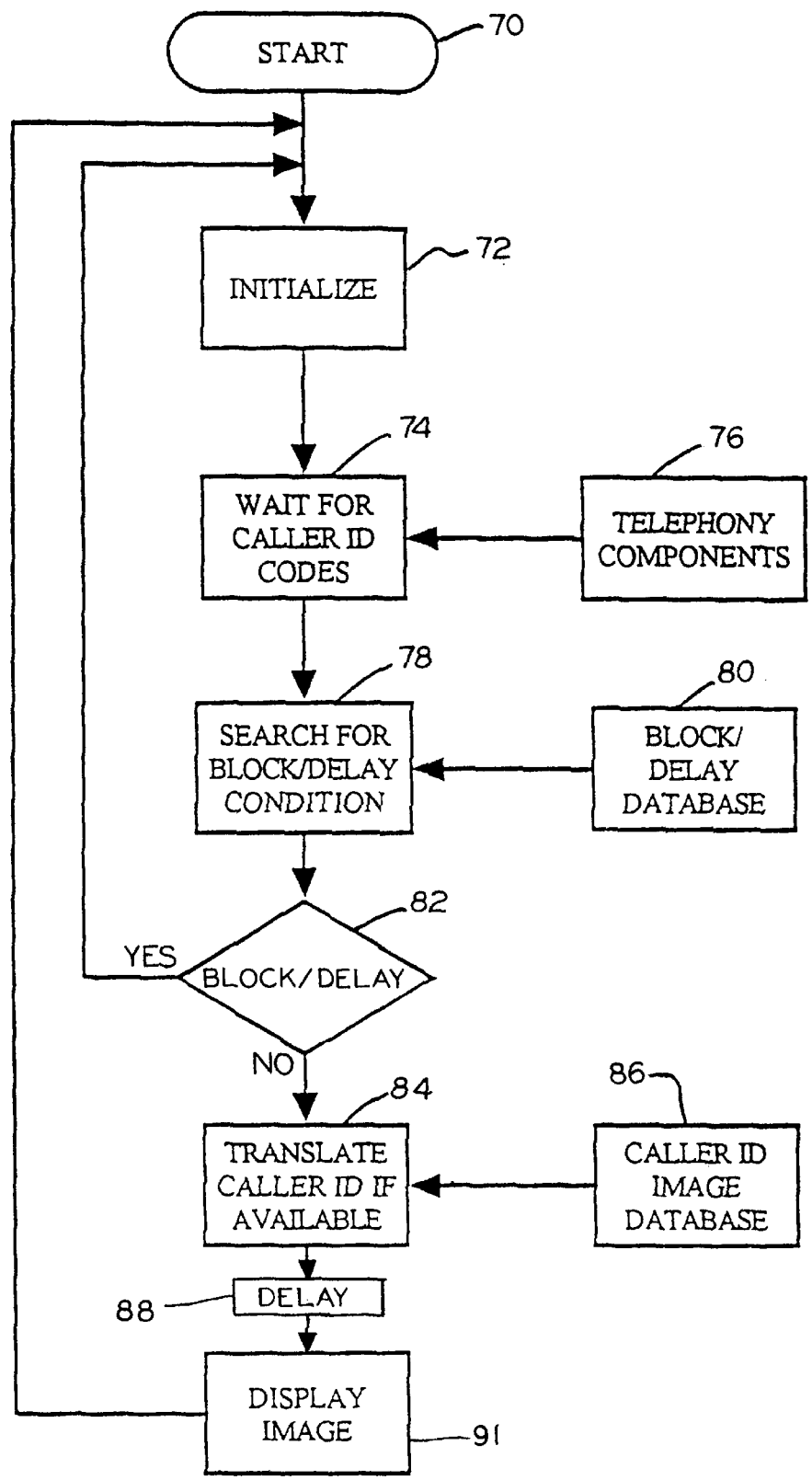
FIG. 4 is a flow diagram of a method of operating the system shown in the FIG. 1 to process telephone calls.

There is shown in the FIG. 4 a flow diagram of a method of operating the system for the display of CID information on a television screen according to the present invention. The method begins at a START 70 entry point and enters an instruction set INITIALIZE 72. The instruction set 72 places the system 10 into a mode of operation in which it can detect any CID signals on a telephone line and translate them into a video and/or audio identification of the calling party. The system initializes its telephone, television, and database components and then enters an instruction set WAIT FOR CALLER ID CODES 74 wherein the system monitors the telephone line to which it is attached and waits for CID information to arrive. The received telephony signals are translated into a digital form useful to the database component of the system by an instruction set TELEPHONY SIGNALS 76.

The method then enters an instruction set SEARCH FOR BLOCK/DELAY CONDITION 78 wherein the digital representation of the CID information is used to search the block/delay database. The user's previously entered instructions for blocking or delaying the display of CID information on the television are retrieved by an instruction set BLOCK/DELAY DATABASE 80.

If the CID under consideration is blocked, the method branches from a decision point BLOCK? 82 at "YES" back to the instruction set 72 to wait for another telephone call. If the CID under consideration is not blocked, the method branches from the decision point 82 at "NO" and waits for an appropriate time to display the information if the CID under consideration is delayed. Then the method enters an instruction set TRANSLATE CALLER ID IF AVAILABLE 84 wherein the system searches the image database for an image to display. An instruction set CALLER ID IMAGE DATABASE 86 provides the associated image and the method then enters an instruction set DELAY IMAGE 88 wherein the system delays the display of the image for an associated predetermined time stored in the data base memory 36. The method then enters an instruction set DISPLAY IMAGE 90 wherein the system displays the image on the television screen. The method then returns to the instruction set 72 for processing the next CID.

While mention has been made that the present invention is useful in the monitoring of unwanted telephone calls, the invention is also very useful in the screening or monitoring of wanted telephone calls from clients, friends, family, etc. Furthermore, while a television 22 has been described for displaying the CID information, any type of video display means could be used.

In summary, the present invention concerns the system 10 for screening telephone calls including caller identification information signals which system includes: the caller identification processor means 14 means having an input/output for connection to the telephone line 12 and being responsive to a caller identification information signal for generating a processed caller identification information signal at an output; the computer means 30 having a first input connected to the caller identification processor means output, a second input for connection to the source 20 of a program signal and an output for connection to the television 22, the computer means being responsive to a program signal at the second input for generating a program output signal at the computer means output; and the database memory means 36 for storing at least one image associated with a predetermined caller identification information signal and having an input/output connected to an input/output of the computer means. When the caller identification processor means input is connected to the telephone line 12, the computer means second input is connected to the source 20 of the program signal and the computer means output is connected to the television 22, the caller identification processor means 14 responds to the predetermined caller identification information signal received on the telephone line to generate the processed caller identification information signal, the computer means responds to the processed caller identification information signal to obtain the one image from the database memory and responds to a program signal received from the program signal source to generate a program output signal to the television and display the one image on the television.

The present invention also concerns a method of screening telephone calls including caller identification information signals including the steps of: storing at least one image associated with a predetermined caller identification information signal; monitoring the telephone line 12 for the predetermined caller identification information signal; obtaining the one image from the storage 36 when the predetermined caller identification information signal is generated on the telephone line by a caller; combining the one image with a program signal; and displaying the program signal and the one image on the video display 22 to inform a user viewing the video display of information related to an identity of the caller. The method also includes the step of storing a predetermined time delay associated with the predetermined caller identification information signal, the step of obtaining the predetermined time delay from storage when the predetermined caller identification information signal is generated on the telephone line by the caller and the step of delaying the display of the program signal and the one image by the amount of the predetermined time delay.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for screening telephone calls including caller identification information signals comprising:

a computer means having a first input for connection to a source of a caller identification information signal, a second input for connection to a source of a program signal, a third input and an output for connection to a video display means, said computer means being responsive to a program signal at said second input for generating a program output signal at said computer means output;

a database memory means for storing at least one image associated with a predetermined caller identification information signal and having an input/output connected to an input/output of said computer means whereby when said computer means first input is connected to a source of a caller identification information signal, said computer means responds to said caller identification information signal to obtain said one image from said database memory and responds to a program signal received from said program signal source to generate a program output signal to the video display means and display said image on the video display means;

an input device connected to said third input of said computer means for generating data signals, said computer means storing images in said database memory in response to said data signals; and a predetermined time delay stored in said database memory and associated with the predetermined caller identification information signal, said computer means responding to said predetermined time delay by delaying the display of said one image by an amount of said predetermined time delay.

2. The apparatus according to claim 1 including an input device connected to a third input of said computer means for generating data signals, said computer means storing said predetermined time delay in said database memory in response to said data signals.

3. The apparatus according to claim 1 including a caller identification processor means having an input/output for connection to the telephone line and being responsive to a caller identification information signal for generating a processed caller identification information signal at an output, said computer means first input being connected to said caller identification processor means output and said computer means responding to said processed caller identification information signal to obtain said one image from said database memory.

4. The apparatus according to claim 1 including an audio/video processor means having a first input connected to said computer means output, having said computer means second input and having said computer means output, said audio/video processor means combining the program signal and said one image to generate said program signal output whereby said one image is superposed on the program signal.

5. The apparatus according to claim 4 including a decoder means connected between said computer means second input and said audio/video processor means for decoding the program signal.

6. The apparatus according to claim 1 including a television connected to said computer means output as the video display means.

7. A system for screening telephone calls including caller identification information signals comprising:

a caller identification processor means having an input/output for connection to a telephone line and being responsive to a caller identification information signal for generating a processed caller identification information signal at an output;

a video display means;

a computer means having a first input connected to said caller identification processor means output, a second input of connection to a source of a program signal, a third input and an output connected to said video display means, said computer means being responsive to a program signal at said second input for generating a program output signal at said computer means output;

a database memory means for storing at least one image associated with a predetermined caller identification information signal and having an input/output connected to an input/output of said computer means whereby when said caller identification processor means input is connected to a telephone line and said computer means second input is connected to a source of a program signal, said caller identification processor means responds to said predetermined caller identification information signal, said computer means responds to said processed caller identification information signal to obtain said one image from said database memory and responds to a program output signal to said video display means and display said one image on said video display means; and an input device connected to said third input of said computer means for generating data signals, said computer means responding to said data signals by storing a predetermined time delay in said database memory, said computer means responding to said predetermined time delay by delaying the display of said one image by an amount of said predetermined time delay.

8. The apparatus according to claim 7 wherein said video display means is a television.

9. The apparatus according to claim 7 including an audio/video processor having an input connected to said computer means output and including said computer means second input for combining the program signal and said one image to generate said program signal output whereby said one image is superposed on the program signal.

10. The apparatus according to claim 7 including a decoder connected to said second input of said computer means for decoding coded program signals.

11. The apparatus according to claim 7 including an input device connected to a third input of said computer means for generating data signals to change said one image.

12. A method of screening telephone calls including caller identification information signals including the steps of:

a. storing at least one image and predetermined time delay associated with a predetermined caller identification information signal;

b. monitoring a telephone line for the predetermined caller identification information signal;

c. obtaining the one image and the predetermined time delay from storage when the predetermined caller identification information signal is generated on the telephone line by a caller;

d. combining the one image with a program signal;

e. delaying the display of the program signal and the one image on a video display by the predetermined time delay; and f. displaying program signal and the one image on a video display to inform a user viewing the video display of information related to an identity of the caller.

* * * * *